US009388896B2

(12) United States Patent
Hibino et al.

(10) Patent No.: US 9,388,896 B2
(45) Date of Patent: Jul. 12, 2016

(54) CONTINUOUSLY VARIABLE TRANSMISSION

(71) Applicants: Akira Hibino, Susono (JP); Hiroyuki Ogawa, Susono (JP); Yuki Aratsu, Susono (JP)

(72) Inventors: Akira Hibino, Susono (JP); Hiroyuki Ogawa, Susono (JP); Yuki Aratsu, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/437,945

(22) PCT Filed: Sep. 24, 2013

(86) PCT No.: PCT/JP2013/075772
§ 371 (c)(1),
(2) Date: Apr. 23, 2015

(87) PCT Pub. No.: WO2014/069125
PCT Pub. Date: May 8, 2014

(65) Prior Publication Data
US 2015/0323058 A1 Nov. 12, 2015

(30) Foreign Application Priority Data
Oct. 31, 2012 (JP) ................................. 2012-241120

(51) Int. Cl.
*F16H 57/04* (2010.01)
*F16H 15/52* (2006.01)

(52) U.S. Cl.
CPC ............ *F16H 57/0424* (2013.01); *F16H 15/52* (2013.01); *F16H 57/04* (2013.01); *F16H 57/043* (2013.01); *F16H 57/0409* (2013.01); *F16H 57/0487* (2013.01)

(58) Field of Classification Search
CPC .............. F16H 57/0487; F16H 57/043; F16H 57/0409; F16H 15/52
See application file for complete search history.

(56) References Cited

U.S. PATENT DOCUMENTS 6,110,070 A * 8/2000 Nagai .................... F16H 57/043
184/6.12
8,313,405 B2 * 11/2012 Bazyn ..................... F16H 15/52
475/185
8,622,866 B2 * 1/2014 Bazyn ..................... F16H 15/52
475/189

(Continued)

FOREIGN PATENT DOCUMENTS

JP 2008-516165 A 5/2008
WO WO 2006/041718 A2 4/2006

OTHER PUBLICATIONS

International Search Report issued Nov. 12, 2013 in PCT/JP2013/075772 Filed Sep. 24, 2013.

*Primary Examiner* — David J Hlavka
(74) *Attorney, Agent, or Firm* — Oblon, McClelland, Maier & Neustadt, L.L.P.

(57) ABSTRACT

A continuously variable transmission includes a shaft, first and second rotary members, a sun roller, a carrier, planetary balls, a gear shifter for changing a gear ratio between input and output by tilting each of the planetary balls, a casing for accommodating these elements, and a lubricating oil supply opening for supplying lubricating oil into the casing. The casing includes a discharge opening for discharging the lubricating oil to the outside of the casing. The discharge opening is provided in a wall of the casing in an axial direction of the shaft and radially outside the lubricating oil supply opening. As seen in the axial direction, the discharge opening is formed either at a position that crosses a contact section between the planetary ball and each of the first and second rotary members or an auxiliary contact section, or radially outside the contact section or the auxiliary contact section.

7 Claims, 8 Drawing Sheets

(56) References Cited

U.S. PATENT DOCUMENTS

| | | | | |
|---|---|---|---|---|
| 2003/0181280 A1* | 9/2003 | Elser | ............... | F16H 15/38 475/207 |
| 2006/0180014 A1* | 8/2006 | Yoshida | ............ | F16H 39/14 91/501 |
| 2009/0221391 A1* | 9/2009 | Bazyn | ............... | F16H 15/52 475/159 |
| 2010/0267510 A1* | 10/2010 | Nichols | ............ | B62M 11/16 475/189 |
| 2014/0235401 A1* | 8/2014 | Tomomatsu | ............ | F16H 15/40 476/38 |

* cited by examiner

CONTINUOUSLY VARIABLE TRANSMISSION

TECHNICAL FIELD

The invention relates to a continuously variable transmission of traction drive type that includes: plural power transmission elements having a common rotation center axis; and plural rolling members radially arranged around the rotation center axis, and that continuously changes a gear ratio between input and output by tilting each of the rolling members that is interposed between two of the plural power transmission elements.

BACKGROUND ART

Conventionally, as a continuously variable transmission of this type, a continuously variable transmission of ball planetary type that includes: a transmission shaft as rotation center; plural power transmission elements that can rotate relatively with a center axis of this transmission shaft being a rotation center axis; and rolling members that are radially arranged around the rotation center axis and held by three of the plural power transmission elements, has been known. In this continuously variable transmission of ball planetary type, each of the rolling members is interposed between the first power transmission element and the second power transmission element that are arranged to face each other, and each of the rolling members is arranged on an outer circumferential surface of the third power transmission element. Such a continuously variable transmission of ball planetary type is disclosed in Patent Literature 1 below. In this continuously variable transmission in Patent Literature 1, an axial oil passage and a radial oil passage are provided in a transmission shaft, and lubricating oil (traction oil) is supplied to a contact section between a rolling member and each of the power transmission elements through these oil passages.

RELATED ART LITERATURE

Patent Literature

Patent Literature 1: Published Japanese Translation of PCT application No. 2008-516165 (JP 2008-516165 A)

SUMMARY OF THE INVENTION

Problem to be Solved by the Invention

By the way, in the continuously variable transmission during operation, since the lubricating oil supplied from the transmission shaft is guided to an outer side in a radial direction by a centrifugal force, the lubricating oil in an amount that corresponds to a difference between a supply amount and a discharge amount is reserved in an annular state on an inner circumferential surface side of a case. Accordingly, in this continuously variable transmission, in the case where a power transmission element having an outer circumferential surface that is coaxial with and face the inner circumferential surface of the case and a rotary member coupled to the power transmission element exist and where this power transmission element and the like are soaked in a reserved portion of the lubricating oil, stirring resistance is generated between the case and this power transmission element and the like. Thus, this may result in deterioration in power transmission efficiency. It should be noted that the continuously variable transmission in above Patent Literature 1 includes a scraper for scraping the lubricating oil to return the lubricating oil to the transmission shaft side. However, this results in complication of a structure. In addition, in order to guide the scraped lubricating oil to the transmission shaft, the lubricating oil has to resist against the centrifugal force, and thus the stirring resistance may not be reduced significantly.

In view of the above, the invention has a purpose of providing a continuously variable transmission with which disadvantages caused by such a conventional example are solved and which can reduce stirring resistance by lubricating oil.

Means for Solving the Problem

In order to achieve the above purpose, the invention includes: a transmission shaft as center of rotation; first to fourth power transmission elements having a first rotation center axis that is coaxial with the transmission shaft and capable of relative rotation to each other in a circumferential direction; rolling members each having a second rotation center axis, arranged radially around the first rotation center axis on an outer circumferential surface of the third power transmission element, interposed between the first and second power transmission elements that are arranged to face each other, and held by the fourth power transmission element in a freely tilted manner; a gear shifter for changing a gear ratio between input and output by tilting each of the rolling members; a casing for accommodating the transmission shaft, the first to fourth power transmission elements, and the rolling members; and a lubricating oil supply opening for supplying lubricating oil into the casing from a radially inner side toward a radially outer side. The casing includes a discharge opening in at least one of side walls of the casing in an axial direction of the transmission shaft and radially outside the lubricating oil supply opening, the discharge opening discharging the lubricating oil in the casing to the outside of the casing. As seen in the axial direction, the discharge opening is formed either at a position that crosses a contact section between the rolling member and each of the first and second power transmission elements or an auxiliary contact section, or radially outside the contact section or the auxiliary contact section.

Here, in the case where a first rotary shaft that is coaxial with and coupled to the first power transmission element and a second rotary shaft that is coaxial with and coupled to the second power transmission element extend to one side wall side in the axial direction of the casing, the discharge opening is desirably provided in another side wall in the axial direction of the casing.

In addition, a guide section for guiding the lubricating oil in the casing to the discharge opening is desirably provided in the casing.

Furthermore, in the case where the lubricating oil in the casing is brought into an annular state on the radially outer side in the casing by a centrifugal force during operation, the discharge opening is desirably formed at a position that crosses an oil surface on the radially inner side of the annular lubricating oil or radially outside the oil surface as seen in the axial direction.

Moreover, in the case where the lubricating oil in the casing is brought into the annular state on the radially outer side in the casing by the centrifugal force during the operation and where the oil surface on the radially inner side of the lubricating oil in the annular state exists within a range in a radial direction from the respective contact section between each of the first and second power transmission elements and each of the rolling members to a lubricating oil guide surface of the guide section, the discharge opening is desirably formed at a position that crosses the oil surface as seen in the axial direction.

In addition, the discharge opening desirably communicates between the inside of the casing and a shift gear chamber for accommodating a shift gear of the gear shifter.

Effect of the Invention

In the continuously variable transmission according to the invention, the lubricating oil in the casing is discharged from the discharge opening to the outside of the casing. Thus, in this continuously variable transmission, even when the centrifugal force acts on the lubricating oil in the casing, a flow rate of the lubricating oil that enters a space between an inner circumferential surface of the casing and a member having an outer circumferential surface that faces the inner circumferential surface (the first power transmission element or the second power transmission element) can be reduced. In this continuously variable transmission, a magnitude of stirring resistance by the lubricating oil against the member can be reduced, and the member can rotate smoothly. Therefore, deterioration in power transmission efficiency can be suppressed. In addition, in this continuously variable transmission, the magnitude of the stirring resistance by the lubricating oil against the member can be reduced without expanding the casing in the radial direction. Thus, this continuously variable transmission can also contribute to improved installability thereof to a vehicle and suppression of increased cost.

MODES FOR CARRYING OUT THE INVENTION

Figure 1:
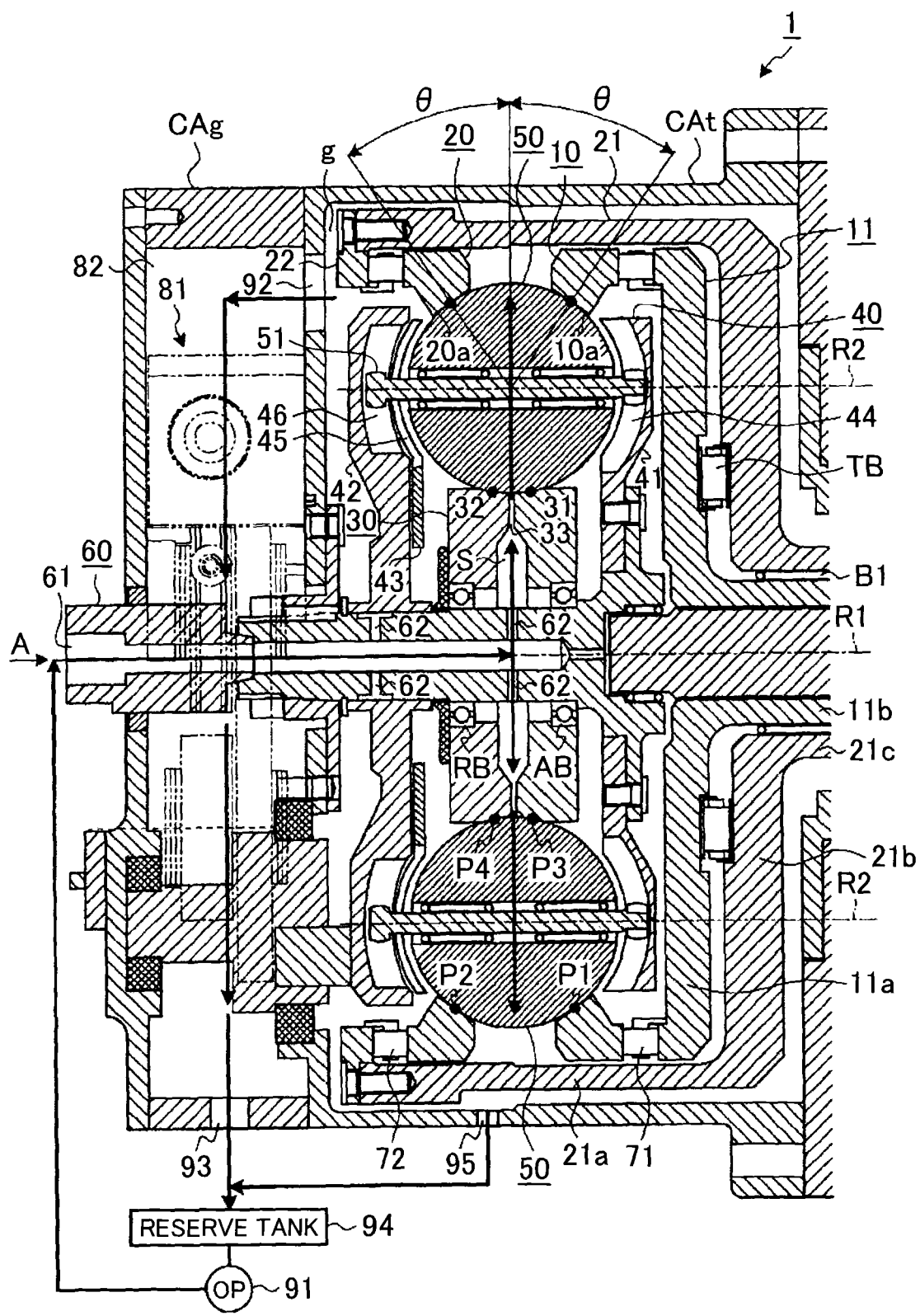
FIG. 1 is a cross-sectional view of one example configuration of a continuously variable transmission of an embodiment according to the invention.

A detailed description will hereinafter be made on an embodiment of a continuously variable transmission according to the invention on the basis of the drawings. It should be noted that the invention is not limited to this embodiment.

Embodiment

An embodiment of a continuously variable transmission according to the invention will be described on the basis of FIG. 1 to FIG. 8.

First, one example of a continuously variable transmission of traction drive type in this embodiment will be described by using FIG. 1. This continuously variable transmission includes a continuously variable transmission mechanism of ball planetary type that corresponds to a traction planetary mechanism. A reference numeral 1 in FIG. 1 indicates one example of the continuously variable transmission of ball planetary type in this embodiment.

The continuously variable transmission mechanism of this embodiment includes: four power transmission elements having a common first rotation center axis R1; rolling members that are radially arranged around the first rotation center axis R1; and a transmission shaft that is arranged at rotation center of the four power transmission elements. The rolling members have a second rotation center axis R2, which differs from the first rotation center axis R1. The rolling members can be tilted on a tilt plane that includes the second rotation center axis R2 of their own and the first rotation center axis R1. Unless otherwise noted, in the following description, a direction along the first rotation center axis R1 is referred to as an axial direction, and a direction around the first rotation center axis R1 is referred to as a circumferential direction. In addition, a direction that crosses the first rotation center axis R1 is referred to as a radial direction. In the radial direction, an inwardly directed side is referred to as a radially inner side, and an outwardly directed side is referred to as a radially outer side.

In this continuously variable transmission mechanism, each of the rolling members is held by three of the four power transmission elements (first to third power transmission elements). Each of the rolling members is held by the remaining power transmission element (a fourth power transmission element) in a freely rotating and tilting manner. The rolling members are radially arranged around the first rotation center axis R1. Then, each of the rolling members is held between the first and second power transmission elements that are arranged to face each other in the axial direction, and is arranged on an outer circumferential surface of the third power transmission element.

This continuously variable transmission mechanism can transmit torque among the first to fourth power transmission elements via each of the rolling members. For example, this continuously variable transmission mechanism can transmit the torque (power) among the first to third power transmission elements via each of the rolling members by generating a traction force (a tangential force) between each of the first to third power transmission elements and each of the rolling members. This traction force is generated by pressing at least one of the first and second power transmission elements against each of the rolling members. Furthermore, this continuously variable transmission mechanism can transmit the torque between the fourth power transmission element and each of the rolling members when rotation of the fourth power transmission element is permitted.

Moreover, in this continuously variable transmission mechanism, the second rotation center axis R2 of the respective rolling member is tilted with respect to the first rotation center axis R1 on the tilt plane, and each of the rolling members is tilted. In this way, a ratio of rotational speed (number of revolutions) between input and output elements, that is, a gear ratio γ is changed.

Two types of a configuration of this continuously variable transmission mechanism are available: in one type, all of the first to fourth power transmission elements are used as rotary elements that can rotate relative to the transmission shaft; and in the other type, any one of the first to fourth power transmission elements is used as a fixed element that cannot rotate relative to the transmission shaft. In the former configuration, any one of the first to fourth power transmission elements serves as a torque input section, and another one thereof serves as a torque output section. Meanwhile, in the latter configuration, since the torque is transmitted among the three power transmission elements other than the fixed element via each of the rolling members, any one of the three power transmission elements serves as the torque input section, and another one of the three power transmission elements serves as the torque output section. For this reason, in this continuously variable transmission mechanism, a ratio of rotational speed (number of revolutions) between the power transmission element as the input section and the power transmission element as the output section is the gear ratio γ. For example, this continuously variable transmission 1 is disposed in a power transmission path of a vehicle. At this time, the input section thereof is coupled to a drive power source side such as an engine (an engine such as an internal combustion engine) and a rotary machine (an electric motor or the like). The output section thereof is coupled to a drive wheel side. There is also a case where another transmission (a stepped manual transmission, a stepped automatic transmission, or the like, for example) is interposed between this continuously variable transmission 1 and the drive wheel side. In this continuously variable transmission 1, rotating motion of each of the power transmission elements when the torque is input to the power transmission element as the input section is referred to as normal drive. The rotating motion of each of the power transmission elements when the torque in a reverse direction from that during the normal drive is input to the power transmission element as the output section is referred to as reverse drive. For example, based on the above exemplification of the vehicle, this continuously variable transmission 1 is in the normal drive when the torque is input from the drive power source side to the power transmission element as the input section and causes rotation of the power transmission element, such as during acceleration. On the other hand, this continuously variable transmission 1 is in the reverse drive when the torque in the reverse direction from that during the normal drive is input from the drive wheel side to the rotating power transmission element as the output section, such as during deceleration.

Here, in the continuously variable transmission 1, the first and second power transmission elements function as a so-called ring gear and the like in the traction planetary mechanism. In addition, the third power transmission element and the fourth power transmission element respectively function as a sun roller and a carrier in the traction planetary mechanism. Furthermore, each of the rolling members functions as a ball-type pinion in the traction planetary mechanism. Accordingly, this continuously variable transmission 1 includes first and second rotary members 10, 20 as the first and second power transmission elements, a sun roller 30 as the third power transmission element, a carrier 40 as the fourth power transmission element, planetary balls 50 as the rolling members, and a shaft 60 as the transmission shaft. The shaft 60 is fixed to a fixed section of the continuously variable transmission 1, such as a casing CAt or a vehicle body, which is not shown. The shaft 60 is a columnar or cylindrical fixed shaft that is configured not to rotate relative to the fixed section. In this continuously variable transmission 1, a state that the first rotation center axis R1 and the second rotation center axis R2 are parallel to each other on the tilt plane (a state in FIG. 1) is set as a reference position. It should be noted that a case where the carrier 40 is used as the fixed element will be exemplified here (however, only rotation of a rotary disc section 42, which will be described below, is allowed). However, various oil passages, which will be described below, can also be applied in the case where the carrier 40 is a rotary element.

The first and second rotary members 10, 20 are disc members or ring members, center axes of which match the first rotation center axis R1. The first and second rotary members 10, 20 are disposed such that they face each other in the axial direction and hold each of the planetary balls 50 therebetween. In this example, both of the first and second rotary members 10, 20 are the ring members.

This continuously variable transmission 1 has contact sections P1, P2, in each of which one of the first and second rotary members 10, 20 and each of the planetary balls 50 make a point contact (more strictly, an ellipsoidal surface contact) with each other. Although details will be described below, each of the planetary balls 50 has an outer circumferential curved surface as a rolling surface, and the outer circumferential curved surface of each of the planetary balls 50 is held between the first and second rotary members 10, 20. That is, each of the planetary balls 50 has the contact sections P1, P2 in the outer circumferential curved surface. Meanwhile, the first and second rotary members 10, 20 hold each of the planetary balls 50 from the radially outer side. Inner circumferential surfaces 10a, 20a of the first and second rotary members 10, 20 have the contact sections P1, P2, respectively. In the inner circumferential surfaces 10a, 20a, the contact sections P1, P2 that are actually in contact with each of the planetary balls 50 and portions that become the contact sections P1, P2 (hereinafter referred to as "auxiliary contact sections") in conjunction with rotation of the first and second rotary members 10, 20 are continuously provided in the circumferential direction. That is, the auxiliary contact sections are portions that repeatedly contact the planetary balls 50 and separate from the planetary balls 50 in conjunction with the rotation of the first and second rotary members 10, 20. Shapes of the contact sections P1, P2 and the auxiliary contact sections of the first and second rotary members 10, 20 are, for example, recessed arc surfaces having the same curvature as the outer circumferential curved surface of the planetary ball 50 or recessed arc surfaces, projected arc surfaces, planes, or the like having different curvature from the outer circumferential curved surface of the planetary ball 50. In addition, the contact sections P1, P2 and the auxiliary contact sections of the first and second rotary members 10, 20 are formed in such shapes that, when a force (a pressing force) in the axial direction is applied from one of the first and second rotary members 10, 20 to each of the planetary balls 50, a force in a direction to the radially inner side and orthogonal to the planetary balls 50 (a normal force) is applied to each of the planetary balls 50.

Here, the inner circumferential surfaces 10a, 20a of the first and second rotary members 10, 20 and the outer circumferential curved surface of each of the planetary balls 50 are formed such that shortest distances from the second rotation center axis R2 to the respective contact sections P1, P2 or the respective auxiliary contact sections are the same in the state of the above reference position. Here, the inner circumferential surfaces 10a, 20a of the first and second rotary members 10, 20 and the outer circumferential curved surface of each of the planetary balls 50 are further formed such that contact angles θ between the first and second rotary members 10, 20 and each of the planetary balls 50 are the same. The contact angle θ refers to an angle defined by a line that connects one of the contact sections P1, P2 or one of the auxiliary contact sections with center of the planetary ball 50 (rotation center and tilt center, or corresponding to center of gravity in the case of a sphere) with respect to a reference plane. The reference plane refers to a plane that has the center of the planetary ball 50 and spreads in the radial direction.

In this example, the first rotary member 10 is used as the torque input section during the normal drive, and the second rotary member 20 is used as the torque output section during the normal drive. In this continuously variable transmission 1, a side on which the first rotary member 10 as the input section is arranged with respect to the above reference plane is referred to as torque input side. A side on which the second rotary member 20 as the output section is arranged with respect to the above reference plane is referred to as torque output side. As for the axial direction, a direction from the output side to the input side is referred to as a torque input direction, and a direction from the input side to the output side is referred to as torque output direction. An input shaft (a first rotary shaft) 11 that is concentric with the first rotary member 10 is coupled to the first rotary member 10. An output shaft (a second rotary shaft) 21 that is concentric with the second rotary member 20 is coupled to the second rotary member 20.

The input shaft 11 and the output shaft 21 extend together on one of the torque input side and output side. The input shaft 11 and the output shaft 21 in this example extend together on the torque input side, on which the first rotary member 10 and the like are disposed. The input shaft 11 includes: a disc section 11a, the first rotary member 10 being coupled to an outer edge portion thereof; and a cylindrical section 11b that extends in the torque input direction from a radially inner portion of this disc section 11a. The disc section 11a is arranged in the torque input direction from the first rotary member 10 and the carrier 40. Together with the first rotary member 10, the disc section 11a covers a first disc member 41 of the carrier 40, which will be described below. Meanwhile, the output shaft 21 includes a first cylindrical section 21a that covers the first and second rotary members 10, 20 from the radially outer side, a disc section 21b that has an end of this first cylindrical section 21a in the torque input direction as an outer edge, and a second cylindrical section 21c that extends in the torque input direction from a radially inner portion of this disc section 21b. The first cylindrical section 21a is coupled to the second rotary member 20 via an annular member 22 that is fixed to an end of the first cylindrical section 21a in the torque output direction. The disc section 21b is arranged in the torque input direction from the disc section 11a of the input shaft 11. The second cylindrical section 21c covers the cylindrical section 11b of the input shaft 11 from the radially outer side.

These input shaft 11 and output shaft 21 can rotate about the first rotation center axis R1 in the circumferential direction. In addition, these input shaft 11 and output shaft 21 can rotate relative to each other in the circumferential direction via a bearing B1 and a thrust bearing TB that are interposed therebetween. Furthermore, these input shaft 11 and output shaft 21 can rotate relative to the shaft 60 in the circumferential direction.

An axial force generation section 71 for generating an axial force is provided between the input shaft 11 and the first rotary member 10. The axial force is the pressing force in the axial direction for pressing the first rotary member 10 against each of the planetary balls 50. Here, a torque cam is used for the axial force generation section 71. Accordingly, when an engagement section or an engagement member provided in the outer edge portion of the disc section 11a is engaged with an engagement section or an engagement member provided on the first rotary member 10 side, this axial force generation section 71 generates the axial force and transmits rotary torque between the input shaft 11 and the first rotary member 10, and also causes integral rotation of the input shaft 11 and the first rotary member 10. Meanwhile, in this continuously variable transmission 1, an axial force generation section 72 is also disposed between the output shaft 21 and the second rotary member 20. The axial force generation section 72 generates the pressing force in the axial direction (the axial force) for pressing the second rotary member 20 against each of the planetary balls 50. The same type of the torque cam as the axial force generation section 71 is used for the axial force generation section 72. This axial force generation section 72 is connected to the output shaft 21 via the annular member 22.

This continuously variable transmission 1 can use the axial force to generate a traction force during operation between the first rotary member 10 and each of the planetary balls 50, between the second rotary member 20 and each of the planetary balls 50, and between the sun roller 30 and each of the planetary balls 50.

It should be noted that, in this continuously variable transmission 1, the first rotary member 10 can serve as the torque output section and the second rotary member 20 can serve as the torque input section. In this case, a shaft that is provided as the input shaft 11 is used as an output shaft, and a shaft that is provided as the output shaft 21 is used as an input shaft. In addition, when the sun roller 30 is used as the torque input section or the torque output section, an input shaft or an output shaft that is separately configured for the sun roller 30 is coupled to the sun roller 30.

The sun roller 30 is arranged in a concentric manner with the shaft 60 and rotates relative to this shaft 60 in the circumferential direction. The plural number of planetary balls 50 is radially arranged at substantially equal intervals on an outer circumferential surface of this sun roller 30. Thus, in this sun roller 30, the outer circumferential surface thereof serves as a rolling surface when the planetary balls 50 rotate. This sun roller 30 can rolling (rotation) of the respective planetary ball 50 by its own rotating motion, and can also rotate in conjunction with rolling motion (rotating motion) of the respective planetary ball 50.

In the sun roller 30 of this embodiment, a contact section with the respective planetary ball 50 is divided into two locations (a first contact section P3, a second contact section P4) in the axial direction. A reason for this configuration is to reduce surface pressure by dispersing a contact force between the sun roller 30 and the planetary balls 50 and thereby reduce spinning loss. In this way, deterioration in power transmission efficiency can be suppressed, and durability can be improved. The first contact section P3 is provided on one side in the axial direction with the above reference plane being the center. On the other hand, the second contact section P4 is provided on another side in the axial direction with the reference plane being the center. Then, the first and second contact sections P3, P4 are provided at positions at which distances from the center of each of the planetary balls 50 (the rotation center and the tilt center, or corresponding to the center of gravity in the case of the sphere) are the same and at which shortest distances from the first rotation center axis R1 are also the same. In the first and second contact sections P3, P4, the sun roller 30 and each of the planetary balls 50 make a point contact (more strictly, a surface contact) with each other.

This sun roller 30 is divided into two rotary bodies (a first rotary body 31, a second rotary body 32) that can rotate relative to the shaft 60 in the circumferential direction. The first rotary body 31 is provided with the first contact section P3, and the second rotary body 32 is provided with the second contact section P4. It is because energy loss between the sun roller 30 and the planetary balls 50 is reduced by rotating the first and second rotary bodies 31, 32 relative to each other in the circumferential direction, and in this way, the deterioration in power transmission efficiency can be suppressed.

In this sun roller 30, the first rotary body 31 is arranged on the one side in the axial direction with the above reference plane being the center, and the second rotary body 32 is arranged on the other side in the axial direction with the reference plane being the center. The first and second rotary bodies 31, 32 are respectively attached to the shaft 60 via an angular bearing AB and a radial bearing RB such that the first and second rotary bodies 31, 32 can rotate relative to the shaft 60 in the circumferential direction.

In the first contact section P3, a pressing force that is in the axial direction to the second rotary body 32 side and in an orthogonal direction to the radially outer side acts on the planetary balls 50 from the first rotary body 31. Meanwhile, in the second contact section P4, a pressing force that is in the axial direction to the first rotary body 31 side and in the orthogonal direction to the radially outer side acts on the planetary balls 50 from the second rotary body 32. For the above reason, in this the sun roller 30, the first rotary body 31 has a conical section, an outer diameter of which is uniformly reduced as the conical section approaches the second rotary body 32. The second rotary body 32 has a conical section, an outer diameter of which is uniformly reduced as the conical section approaches the first rotary body 31. The first contact section P3 and the second contact section P4 are respectively provided in outer circumferential surfaces of the conical sections. In addition, instead of the conical sections, the first rotary body 31 and the second rotary body 32 may have arc-shaped pyramid sections. The arc-shaped pyramid section is in a shape, an outer diameter of which is parabolically reduced as the arc-shaped pyramid section approaches the other rotary body. The first contact section P3 and the second contact section P4 are respectively provided in outer circumferential surfaces of the arc-shaped pyramid sections. The conical section or the arc-shaped pyramid section is formed in all or part of an outer circumferential surface of each of the first rotary body 31 and the second rotary body 32.

The planetary ball 50 is the rolling member that rolls on the circumferential surface of the sun roller 30 with a support shaft 51 being the center. This planetary ball 50 preferably has a perfect spherical body. However, the planetary ball 50 may have a spherical shape at least in a rolling direction, for example, an ellipsoidal cross section such as a rugby ball. The support shaft 51 penetrates the planetary ball 50 while passing through the center thereof, and rotatably supports the planetary ball 50. For example, the planetary ball 50 can make relative rotation (that is, rotate) about the second rotation center axis R2 with respect to the support shaft 51 by a bearing, such as a needle bearing, that is disposed between the planetary ball 50 and an outer circumferential surface of the support shaft 51. Both ends of the support shaft 51 are projected from the planetary ball 50.

A reference position of the support shaft 51 is the above-described reference position in FIG. 1, at which the second rotation center axis R2 is parallel to the first rotation center axis R1. Together with the planetary ball 50, this support shaft 51 can swing (be tilted) in a range between the reference position and a position tilted therefrom in the tilt plane. The support shaft 51 is tilted in the tilt plane with the center of the planetary ball 50 being a fulcrum point.

The carrier 40 supports projected sections of the respective support shaft 51 so as not to interrupt tilted motion of the respective planetary ball 50. For example, this carrier 40 has a center axis that matches the first rotation center axis R1, and also has first to third disc sections 41, 42, 43 that are arranged to face each other in the axial direction. In this carrier 40, the first disc section 41 and the second disc section 42 are arranged with a space being interposed therebetween in the axial direction. Then, the third disc section 43 is arranged near one of the first disc section 41 and the second disc section 42. Then, in this carrier 40, the sun roller 30 and the planetary balls 50 are arranged between two of the first to third disc sections 41, 42, 43. In this example, the third disc section 43 is arranged at a position that is between the first disc section 41 and the second disc section 42 and that is near the second disc section 42. Then, the sun roller 30 and the planetary balls 50 are arranged between the first disc section 41 and the third disc section 43. It should be noted that the third disc section 43 does not have to be always provided in this carrier 40.

In this carrier 40, one of the first and second disc sections 41, 42 is configured that it can rotate relative to the shaft 60 in the circumferential direction, and the other of the first and second disc sections 41, 42 is configured that it cannot rotate relative to the shaft 60 in the circumferential direction. In addition, the third disc section 43 is configured that it cannot rotate relative to the shaft 60 in the circumferential direction. In this example, the first and third disc sections 41, 43 cannot rotate relative to the shaft 60, and the second disc section 42 can rotate relative to the shaft 60. An inner diameter side of the first disc section 41 is fixed to an outer diameter side of the shaft 60 by a screw member or the like, for example. An inner diameter side of the second disc section 42 is attached to the outer diameter side of the shaft 60 via a bearing (not shown). The third disc section 43 is coupled to the first disc section 41, for example, by the plural number of support shafts (not shown). The first disc section 41 and the third disc section 43 define a basket shape, and a portion of the planetary ball 50 is projected from a space between the support shafts. It should be noted that the first and second rotary members 10, 20 contact the projected portion of the planetary ball 50. Hereinafter, the first disc section 41 is referred to as a first fixed disc section 41, the second disc section 42 is referred to as the rotary disc section 42, and the third disc section 43 is referred to as a second fixed disc section 43.

In this continuously variable transmission 1, the first rotary member 10, the second rotary member 20, the sun roller 30, the carrier 40, the planetary balls 50, the shaft 60, the axial force generation sections 71, 72, the input shaft 11, and the output shaft 21 are accommodated in the tightly sealed casing CAt (except for communicating portions with the outside by lubricating oil discharge openings 92, 95, which will be described below). The shaft 60, the cylindrical section 11b of the input shaft 11, and the second cylindrical section 21c of the output shaft 21 are projected from the casing CAt in the axial direction while keeping a tightly sealed state of the casing CAt.

Here, in this continuously variable transmission 1, when a tilt angle of the respective planetary ball 50 is at the reference position, that is, zero degree, the first rotary member 10 and the second rotary member 20 rotate at the same rotational speed (the same number of revolutions). In other words, at this time, a rotation ratio of the first rotary member 10 to the second rotary member 20 (a ratio of the rotational speed or the number of revolutions) is 1, and the gear ratio $\gamma$ is 1. Meanwhile, when the respective planetary ball 50 is tilted from the reference position, the shortest distance from a center axis of the support shaft 51 (the second rotation center axis R2) to the contact section P1 with the first rotary member 10 is changed. The shortest distance from the center axis of the support shaft 51 to the contact section P2 with the second rotary member 20 is also changed. For this reason, one of the first rotary member 10 and the second rotary member 20 rotates at a higher speed than a speed at which one of the first rotary member 10 and the second rotary member 20 rotates at the reference position. On the contrary, the other of the first rotary member 10 and the second rotary member 20 rotates at a lower speed than a speed at which the other of the first rotary member 10 and the second rotary member 20 rotates at the reference position. For example, the second rotary member 20 rotates at the lower speed than the first rotary member 10 (is decelerated) when the planetary ball 50 is tilted to one side, and rotates at the higher speed than the first rotary member 10 (is accelerated) when the planetary ball 50 is tilted to another side. Accordingly, in this continuously variable transmission 1, the rotation ratio of the first rotary member 10 to the second rotary member 20 (the gear ratio γ) can be changed continuously by changing the tilt angle. It should be noted that the planetary ball 50 on an upper side in FIG. 1 is tilted counterclockwise on the sheet and the planetary ball 50 on a lower side is tilted clockwise on the sheet during acceleration (γ<1). Meanwhile, during deceleration (γ>1), the planetary ball 50 on the upper side in FIG. 1 is tilted clockwise on the sheet, and the planetary ball 50 on the lower side is tilted counterclockwise on the sheet.

This continuously variable transmission 1 is provided with a gear shifter for changing the gear ratio γ. Since the gear ratio γ is changed in conjunction with the change in the tilt angles of the planetary balls 50, a tilting device for tilting each of the planetary balls 50 is used as the gear shifter. Here, the carrier 40 has a function as the tilting device (the gear shifter).

Figure 2:
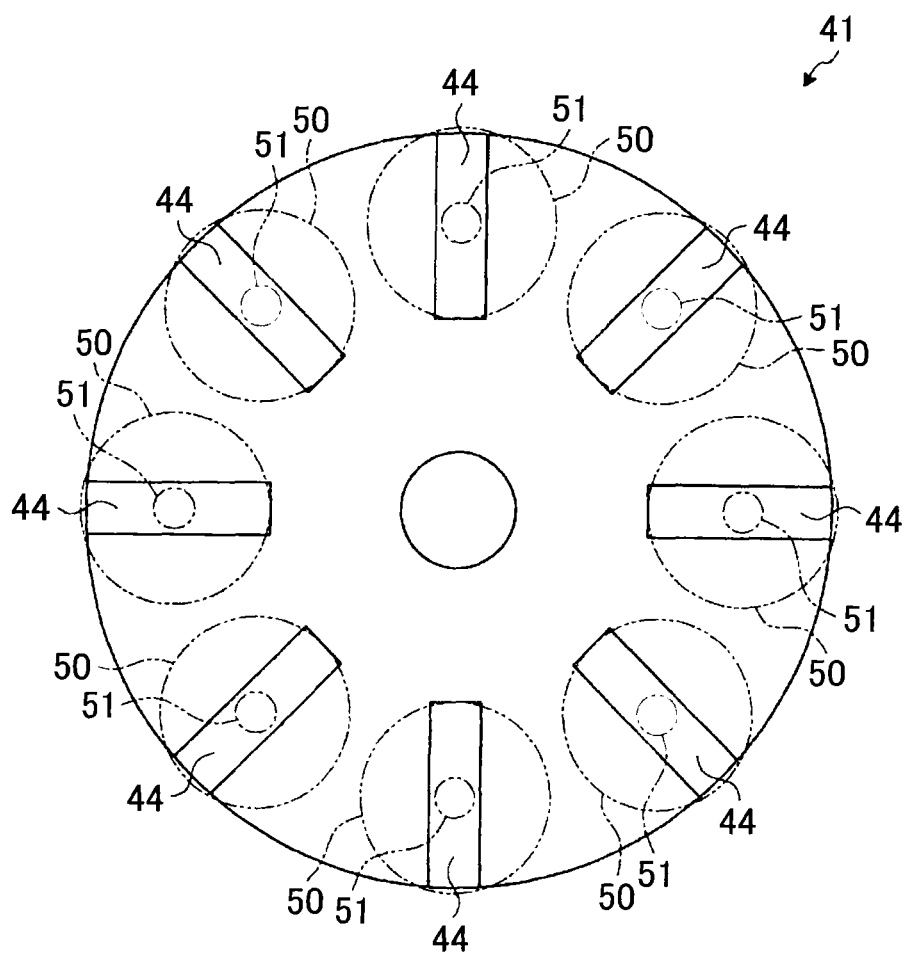
FIG. 2 illustrates one fixed disc section in a carrier.
Figure 3:
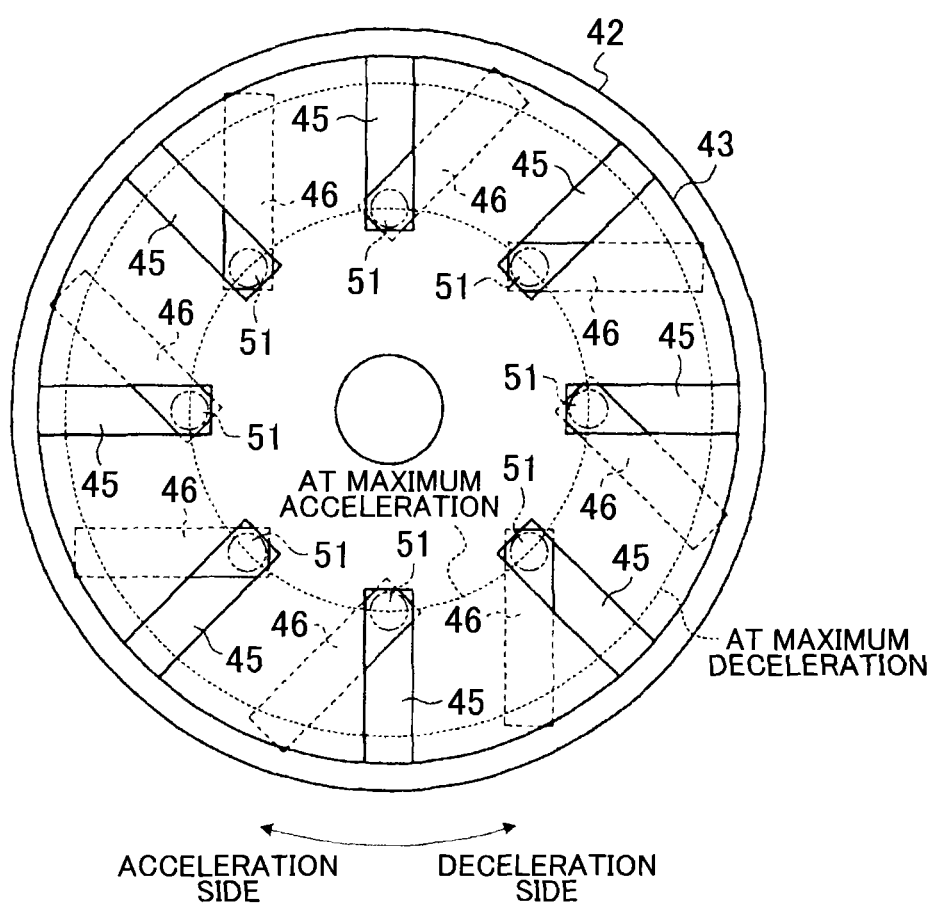
FIG. 3 illustrates the other fixed disc section and a rotary disc section in the carrier.

First, the first and second fixed disc sections 41, 43 are respectively provided with radial direction guide sections 44, 45 for each of the planetary balls 50. The radial direction guide sections 44, 45 are guide sections for guiding the ends of the support shaft 51, which is projected from the planetary ball 50, in the radial direction when a tilting force is applied to the ends thereof. The radial direction guide section 44 is a guide groove or a guide opening, a longitudinal direction of which is set in the radial direction, for example (FIG. 2). Meanwhile, the radial direction guide section 45 is a guide opening, a longitudinal direction of which is set in the radial direction (FIG. 3), and which the support shaft 51 penetrates. In other words, in the first and second fixed disc sections 41, 43, each of the radial direction guide sections 44, 45 radiates from the first rotation center axis R1 as seen in the axial direction. The radial direction guide sections 44, 45 are respectively formed at positions at which the radial direction guide sections 44, 45 face each other in the axial direction, and respectively support the support shaft 51 such that the second rotation center axis R2 is substantially located on the tilt plane irrespective of a magnitude of the gear ratio γ. A reason for using expression of "substantially" is because a slight space is provided between the support shaft 51 and each of the radial direction guide sections 44, 45 in a width direction for the smooth tilted motion of the support shaft 51. Here, FIG. 2 is a view in which the first fixed disc section 41 is seen from the planetary ball 50 side in the axial direction. FIG. 3 is a view in which the rotary disc section 42 and the second fixed disc section 43 are seen from the planetary ball 50 side in the axial direction.

Figure 4:
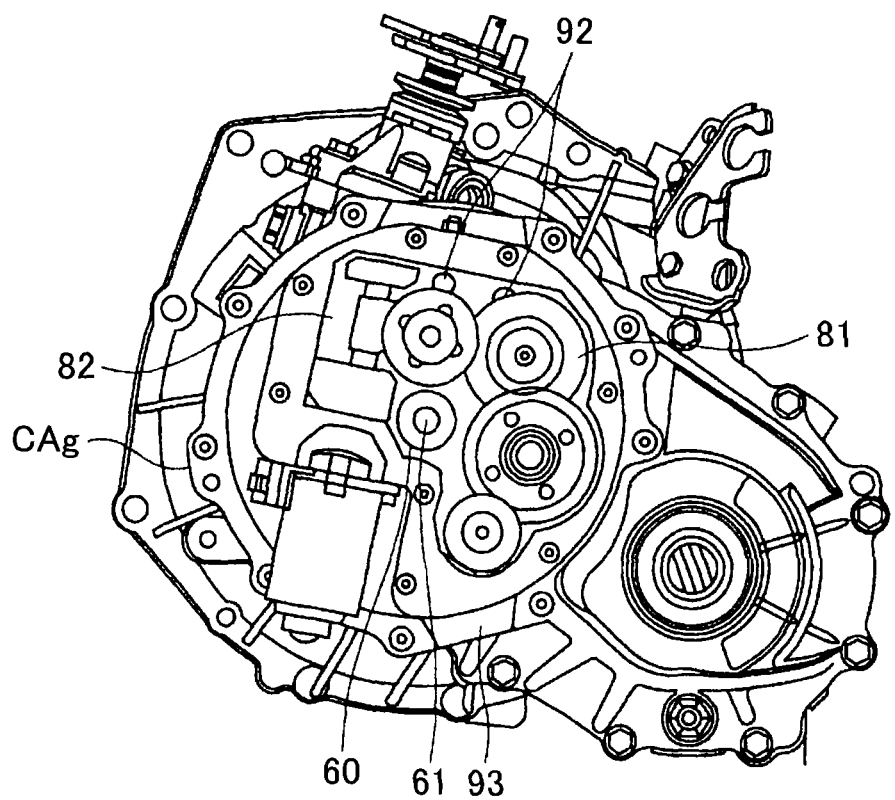
FIG. 4 is a view of an interior of a shift gear chamber in the continuously variable transmission as seen in an arrow A direction in FIG. 1.

As described above, the rotary disc section 42 can rotate relative to the shaft 60 in the circumferential direction. An unillustrated actuator (a drive section), such as an electric motor, is used for the relative rotation. A drive force of this drive section is transmitted to the rotary disc section 42 via a gear train (hereinafter referred to as a "shift gear") 81 of a planetary gear mechanism or the like. The shift gear 81 is arranged on an opposite side from extending directions of the input shaft 11 and the output shaft 21 in the axial direction (in this example, on the torque output side) and on the outer side of the casing CAt. In this example, as shown in FIGS. 1 and 4, the shift gear 81 is arranged radially outside the shaft 60. This shift gear 81 is disposed in a shift gear chamber 82 in a tightly sealed casing CAg (except for communicating portions with the outside by the lubricating oil discharge openings 92, 93, which will be described below). The casing CAg is attached to the casing CAt of the continuously variable transmission 1, and thereby constitutes the shift gear chamber 82. The shaft 60 is projected from the casing CAg in the axial direction while keeping the tightly sealed state of the casing CAg.

Meanwhile, the rotary disc section 42 is provided with a tilting force application section 46 for each of the planetary balls 50. The tilting force application section 46 applies the tilting force to one of the ends of the support shaft 51, which are projected from the planetary hall 50, in conjunction with rotation of the rotary disc section 42. For example, this tilting force application section 46 is a linear groove or opening, a longitudinal direction of which is tilted at a specified tilt angle with respect to the radial direction (FIG. 3). As seen in the axial direction, a portion of this tilting force application section 46 overlaps a portion of the radial direction guide section 45. A crossing portion where the portions overlap each other moves in the radial direction along the rotation of the rotary disc section 42. The one of the ends of the support shaft 51 is supported in the crossing portion. Accordingly, when the rotary disc section 42 is rotated, the tilting force is applied from a side wall surface of the tilting force application section 46 to the one end of this support shaft 51, and the end thereof is guided in the radial direction by the radial direction guide sections 44, 45. In this continuously variable transmission 1, this guided motion corresponds to the tilted motion of the planetary ball 50.

More specifically, in this carrier 40, when the first fixed disc section 41 and the rotary disc section 42 rotate relative to each other, the tilting force that corresponds to the relative rotation acts on the one end of the support shaft 51. For example, when the rotary disc section 42 rotates clockwise on the sheet of FIG. 3, the side wall on the radially outer side of the tilting force application section 46 pushes the one end of the support shaft 51 along the side wall. At this time, a pushing force becomes the tilting force, and the one end of the support shaft 51 moves to the radially inner side by the radial direction guide sections 44, 45. Thus, the gear ratio γ is shifted to the acceleration side. On the other hand, when the rotary disc section 42 rotates counterclockwise on the sheet of FIG. 3, a side wall on the radially inner side of the tilting force application section 46 pushes the one end of the support shaft 51 along the side wall. At this time, a pushing force becomes the tilting force, and the one end of the support shaft 51 moves to the radially outer side by the radial direction guide sections 44, 45. Thus, the gear ratio γ is shifted to the deceleration side. It should be noted that the planetary ball 50 is held by the first rotary member 10, the second rotary member 20, and the sun roller 30. Thus, when the planetary ball 50 is a sphere and applied with the tilting force, the planetary ball 50 is tilted with a position of the center of gravity thereof being the center.

In this continuously variable transmission 1, lubricating oil (so-called traction oil) is used to cool each element (cooling subjects and lubrication subjects) and generate the traction force. For example, the lubricating oil keeps being supplied from an oil pump 91 shown in FIG. 1 to an axial oil passage 61 of the shaft 60. Bold arrows shown in FIG. 1 indicate supply and discharge passages of the lubricating oil. The shaft 60 is formed with at least one radial oil passage 62, and the lubricating oil in the axial oil passage 61 is supplied from the radial oil passage 62 to each element of the continuously variable transmission 1. The radial oil passage 62 is an oil passage that extends in the radial direction and supplies the lubricating oil in the axial oil passage 61 into the casing CAt from the radially inner side toward the radially outer side. Accordingly, a lubricating oil discharge opening in this radial oil passage 62 acts as a lubricating oil supply opening for supplying the lubricating oil into the casing CAt. For example, the shaft 60 is formed with at least one radial oil passage 62 on the above reference plane (that is, on the radially inside side of the sun roller 30). The radial oil passage 62 supplies the lubricating oil in the axial oil passage 61 to an annular space S that is formed between the first rotary body 31 and the second rotary body 32. It should be noted that the space S preferably has a thickness in the axial direction so that the supplied lubricating oil can be reserved therein.

The lubricating oil in the space S is discharged from an annular space (hereinafter referred to as an "annular oil passage") 33 between the first rotary body 31 and the second rotary body 32 to the radially outside by a centrifugal force that is generated in conjunction with rotation of the sun roller 30 or feeding pressure of the oil pump 91. It should be noted that the annular oil passage 33 is thinner than the space S in the axial direction.

The lubricating oil that is discharged from the annular oil passage 33 hits the planetary ball 50, and is then supplied to a space between the sun roller 30 and the planetary ball 50 (particularly, to the first and second contact sections P3, P4). This lubricating oil primarily contributes to cooling and lubrication of the sun roller 30 and the planetary balls 50 as well as to generation of the traction force in the first and second contact sections P3, P4.

Furthermore, the lubricating oil that is discharged from the annular oil passage 33 flows from a space between the adjacent planetary balls 50 to the radially outside, and is then supplied to the first and second rotary members 10, 20 and an inner circumferential surface of the first cylindrical section 21a of the output shaft 21. The lubricating oil just as described and the lubricating oil that flows on a surface of the planetary ball 50 are supplied to a space between each of the first and second rotary members 10, 20 and the planetary ball 50 (particularly, to the contact sections P1, P2). These lubricating oils contribute to cooling and lubrication of the first and second rotary members 10, 20 and the like as well as to generation of the traction force in the contact sections P1, P2. Moreover, these lubricating oils are supplied to the axial force generation sections 71, 72.

During the operation of the continuously variable transmission 1, the lubricating oil in the casing CAt, which includes the lubricating oil discharged from the annular oil passage 33 and the like, is reserved annularly on the radially outer side in the casing CAt by the centrifugal force. For example, in this continuously variable transmission 1, in order to secure an amount of the lubricating oil in the contact sections P1, P2 and prevent the annular lubricating oil from becoming stirring resistance that inhibits the rotating motion of the first rotary member 10 and the second rotary member 20, an amount of the lubricating oil in the casing CAt (that is, a relationship between a supply amount and a discharge amount) is adjusted such that an oil surface of the annular lubricating oil does not exist radially inside the contact sections P1, P2 (that is, such that the oil surface exists at the same positions as the contact sections P1, P2 in the radial direction or radially outside the contact sections P1, P2). Accordingly, in this continuously variable transmission 1, the lubricating oil may enter a space between an inner circumferential surface of the casing CAt and an outer circumferential surface of the first cylindrical section 21a of the output shaft 21. If the lubricating oil enters this space therebetween, this lubricating oil becomes a cause of the stirring resistance. Thus, this lubricating oil may inhibit the rotating motion of the output shaft 21 and the second rotary member 20. Especially, a structure in which a through opening is formed in the first cylindrical section 21a and thus the lubricating oil is likely to flow into the space between the inner circumferential surface of the casing CAt and the outer circumferential surface of the first cylindrical section 21a has conventionally been present.

In view of the above, this continuously variable transmission 1 is provided with at least one discharge opening 92 for discharging the lubricating oil in the casing to the outside of the casing CAt. The discharge opening 92 is provided radially outside the above-described lubricating oil supply opening (that is, a discharge opening of the radial oil passage 62). In addition, as seen in the axial direction, the discharge opening 92 is formed either at a position that crosses the contact sections P1, P2 or the auxiliary contact sections in the space between the planetary ball 50 and each of the first and second rotary members 10, 20 or radially outside the contact sections P1, P2 or the auxiliary contact sections. It should be noted that at least the first cylindrical section of the output shaft 21 in this example is not provided with the through opening.

More specifically, the discharge opening 92 is a circular through opening in the axial direction that is provided in any one of side walls of the casing CAt in the axial direction (any one of side walls on the torque input side and the torque output side in the casing CAt).

In other words, in this continuously variable transmission 1, a position of this discharge opening 92 is determined such that a circumferential edge of a pitch circle defined by the contact sections P1, P2 and the auxiliary contact sections exists in the discharge opening 92 that is seen in the axial direction or such that the discharge opening 92 that is seen in the axial direction exits radially outside the pitch circle. When the circumferential edge of the pitch circle overlaps the discharge opening 92, the lubricating oil that is supplied to the contact sections P1, P2 can be discharged from the discharge opening 92 by the centrifugal force before the lubricating oil is brought into an annular state. In addition, when the discharge opening 92 is provided radially outside the pitch circle, some of the annular lubricating oil that is reserved on the radially outer side in the casing CAt can be discharged from the discharge opening 92.

Figure 5:
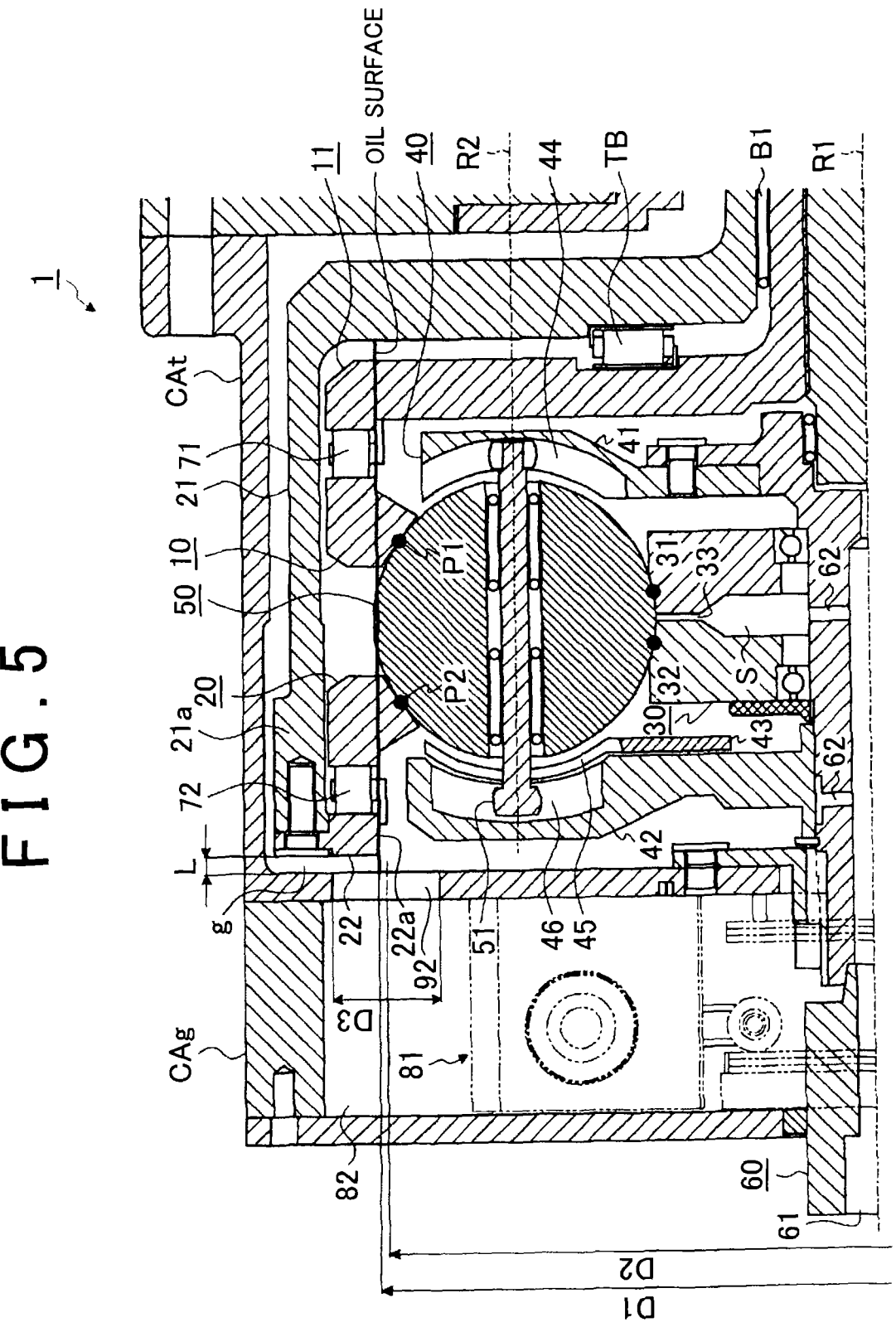
FIG. 5 illustrates a position of a discharge opening.
Figure 6:
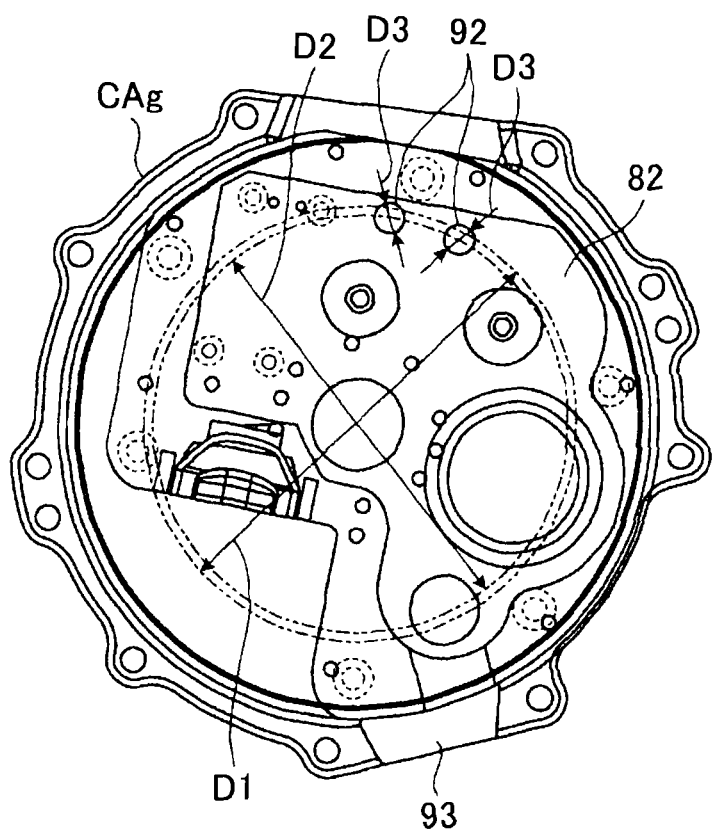
FIG. 6 illustrates the position and a shape of the discharge opening in the embodiment.

Furthermore, this discharge opening 92 may be formed either at a position that crosses the oil surface on the radially inner side of the annular lubricating oil or radially outside the oil surface during the operation as seen in the axial direction. In other words, in this continuously variable transmission 1, a pitch diameter D2, on which center of the discharge opening 92 is located, and a diameter D3 of the discharge opening 92 are determined in accordance with an inner diameter D1 of the annular lubricating oil (FIGS. 5, 6). Since the diameter D3 of the discharge opening 92 is an element that is associated with a discharge amount of the lubricating oil, the diameter D3 is further defined in accordance with a supply amount of the lubricating oil into the casing CAt. It should be noted that each of the inner diameter D1 of the lubricating oil and the pitch diameter D2 of the discharge opening 92 are a diameter, center of which corresponds to the first rotation center axis R1. In addition, in the example of FIG. 6, the two discharge openings 92 are provided.

Here, in this continuously variable transmission 1, the input shaft 11 and the output shaft 21 are arranged together on the torque input side. For this reason, the discharge opening 92 is formed in a side wall of the casing CAt that is on the torque output side in the axial direction.

Furthermore, this continuously variable transmission 1 is provided with a guide section for guiding the lubricating oil in the casing CAt to the discharge opening 92. The guide section in this example guides some of the annular lubricating oil that is reserved on the radially outer side in the casing CAt to the discharge opening 92. This guide section is arranged near the discharge opening 92 in the casing CAt. In this example, the annular member 22 is arranged near the discharge opening 92. Thus, in this continuously variable transmission 1, an inner circumferential surface 22a of the annular member 22 is used as a lubricating oil guide surface of the guide section. In this continuously variable transmission 1, since some of the annular lubricating oil is guided by the inner circumferential surface 22a, the amount of the lubricating oil in the casing CAt is adjusted such that the oil surface of this annular lubricating oil does not exist radially outside the inner circumferential surface 22a (that is, such that the oil surface exists at the same position as the inner circumferential surface 22a in the radial direction or radially inside the inner circumferential surface 22a). FIG. 5 exemplifies a state that the oil surface is flush with the inner circumferential surface 22a. It should be noted that, also in this case, the amount of the lubricating oil in the casing CAt is adjusted such that the oil surface of the annular lubricating oil exists at the same positions as the contact sections P1, P2 in the radial direction or radially outside the contact sections P1, P2.

Here, in the case where the guide section of such a type is provided and where the discharge opening 92 exists radially outside the oil surface of the annular lubricating oil during the operation, the guide section rather becomes an obstacle. As a result, some of the lubricating oil may not be able to be guided to the discharge opening 92. Accordingly, in this case, the discharge opening 92 is preferably formed at a position that crosses the oil surface of the annular lubricating oil as seen in the axial direction. The discharge opening 92 in this case is formed such that the diameter D3 thereof satisfies the following relationship: "D3>|D1−D2|"

The discharge opening 92 can be formed anywhere in the circumferential direction as long as the above condition is satisfied.

In the continuously variable transmission 1 that is configured as described above, once the lubricating oil in the casing CAt is guided to the radially outer side and brought into the annular state by the centrifugal force during the operation, some of the annular lubricating oil is discharged from the discharge opening 92 to the outside of the casing CAt. Accordingly, in this continuously variable transmission 1, even when the centrifugal force acts on the annular lubricating oil, a flow rate of the lubricating oil that enters the space between the inner circumferential surface of the casing CAt and the outer circumferential surface of the first cylindrical section 21a of the output shaft 21 can be reduced from a conventional flow rate. Thus, in this continuously variable transmission 1, a magnitude of the stirring resistance by the lubricating oil against the output shaft 21 and the second rotary member 20 can be reduced from a magnitude of the conventional stirring resistance, and thus the output shaft 21 and the second rotary member 20 can rotate smoothly. Therefore, the deterioration in power transmission efficiency can be suppressed. A suppression effect of the deterioration in power transmission efficiency (that is, an improvement effect of the power transmission efficiency) has the substantially same suppression margin (improvement margin) for the entire gear ratio γ. It should be noted that the lubricating oil flows into this continuously variable transmission 1 via an annular space g between a side wall surface of the casing CAt and a side wall surface of the annular member 22 that face each other.

Furthermore, in this continuously variable transmission 1, it is possible to reduce the magnitude of the stirring resistance against the output shaft 21 and the like, which is caused by the lubricating oil between the inner circumferential surface of the casing CAt and the outer circumferential surface of the first cylindrical section 21a, without enlarging the casing CAt in the radial direction and thereby increasing the space between the inner circumferential surface of this casing CAt and the outer circumferential surface of the first cylindrical section 21a. For example, in order to increase the space, the casing CAt needs to be expanded radially outward. This is apparent from the equation 1 below. Accordingly, in this the continuously variable transmission 1, the deterioration in power transmission efficiency can be suppressed without increasing physical size thereof in the radial direction. Thus, this continuously variable transmission 1 can also contribute to improved installability thereof to the vehicle and suppression of increased cost. It should be noted that "M" in the equation 1 represents the magnitude of the stirring resistance. "R1" represents a radius of the inner circumferential surface of the casing CAt, and "R2" represents a radius of the outer circumferential surface of the first cylindrical section 21a. "μ" represents viscosity of the lubricating oil. "ω" represents angular velocity of the output shaft 21, and "Lout" represents a length of the first cylindrical section 21a in the axial direction.

[Equation 1]

$$M = 2\pi\mu Lout \frac{R1^2 R2}{R2 - R1} \omega \tag{1}$$

By the way, in this continuously variable transmission 1 of the example, the shift gear 81 is provided outwards on the torque output side of the casing CAt. Accordingly, here, the lubricating oil that is discharged from the discharge opening 92 is used to cool and lubricate the shift gear 81. For this purpose, the discharge opening 92 is opened to the shift gear chamber 82. In addition, this discharge opening 92 is preferably arranged above the shift gear 81 in the vehicle when being installed in the vehicle. It should be noted that this discharge opening 92 may be provided on a side of an uppermost gear in the shift gear 81 when being installed in the vehicle as long as the discharge opening 92 can supply the lubricating oil to a tooth surface of this gear.

The lubricating oil that has been used to cool and lubricate the shift gear 81 is guided to a lower section of the shift gear chamber 82 by the gravity. A discharge opening 93 is formed in a lower section of the casing CAg when the casing CAg is installed in the vehicle (FIG. 1). In addition, the discharge opening 93 is connected to a reserve tank 94 via an oil passage. Accordingly, the lubricating oil in the shift gear chamber 82 is discharged to the outside of the shift gear chamber 82 from the discharge opening 93 and delivered to the reserve tank 94. Then, the lubricating oil in the reserve tank 94 is supplied into the casing CAt again by the oil pump 91.

It should be noted that, in this continuously variable transmission 1, the lubricating oil discharge opening 95 is also formed in a lower section of the casing CAt when the continuously variable transmission 1 is installed in the vehicle. The discharge opening 95 communicates between the inner circumferential surface of the casing CAt and the outer circumferential surface of the first cylindrical section 21a of the output shaft 21. In addition, this discharge opening 95 is connected to the reserve tank 94 via the oil passage. For this reason, the lubricating oil that enters the space therebetween is delivered to the reserve tank 94 from the discharge opening 95. Accordingly, in this continuously variable transmission 1, the amount of the lubricating oil therebetween can be reduced from the discharge opening 95. Thus, the magnitude of the stirring resistance against the output shaft 21 and the second rotary member 20 that is caused by the lubricating oil can further be reduced, and the deterioration in power transmission efficiency can further be suppressed.

As it has been described so far, in this continuously variable transmission 1, the amount of the lubricating oil that flows between the inner circumferential surface of the casing CAt and the outer circumferential surface of the first cylindrical section 21a of the output shaft 21 is reduced, and thus the deterioration in power transmission efficiency can be suppressed. However, in order to suppress the deterioration in power transmission efficiency, it is most desirable not to generate the stirring resistance against the output shaft 21 and the second rotary member 20 that is caused by the lubricating oil between the inner circumferential surface of the casing CAt and the outer circumferential surface of the first cylindrical section 21a of the output shaft 21. For this reason, in this continuously variable transmission 1, the amount of the lubricating oil that flows therebetween is reduced as much as possible.

More specifically, a length L (FIG. 5) of the above space g from which the lubricating oil flows therebetween is structurally reduced as much as possible, and the flow of the lubricating oil from this space g is thereby suppressed. "Structurally reduced as much as possible" refers to reducing the length L to a minimum value at which the output shaft 21 (mainly the annular member 22) does not contact the casing CAt regardless of a standstill or operating state after stacking tolerance based on maximum dimensional tolerance of various components, maximum assembling tolerance of the various components, and a deviation amount by deflection of the various components during the operation are considered. In this way, in this continuously variable transmission 1, the flow rate of the lubricating oil that enters the space between the inner circumferential surface of the casing CAt and the outer circumferential surface of the first cylindrical section 21a of the output shaft 21 can be reduced as much as possible. Thus, it is possible to suppress the generation of the stirring resistance against the output shaft 21 and the second rotary member 20 that is caused by the lubricating oil between the inner circumferential surface of the casing CAt and the outer circumferential surface of the first cylindrical section 21a of the output shaft 21. In addition, in this continuously variable transmission 1, even when the lubricating oil flows therebetween, the flow rate thereof is low. Thus, in combination with a discharging effect of the lubricating oil from the above discharge opening 95 in the lower section, it is possible to suppress the generation of the stirring resistance against the output shaft 21 and the like that is caused by the lubricating oil therebetween. Therefore, in this continuously variable transmission 1, the deterioration in power transmission efficiency, which is associated with such stirring resistance, can substantially be suppressed.

[Modification 1]

Figure 7:
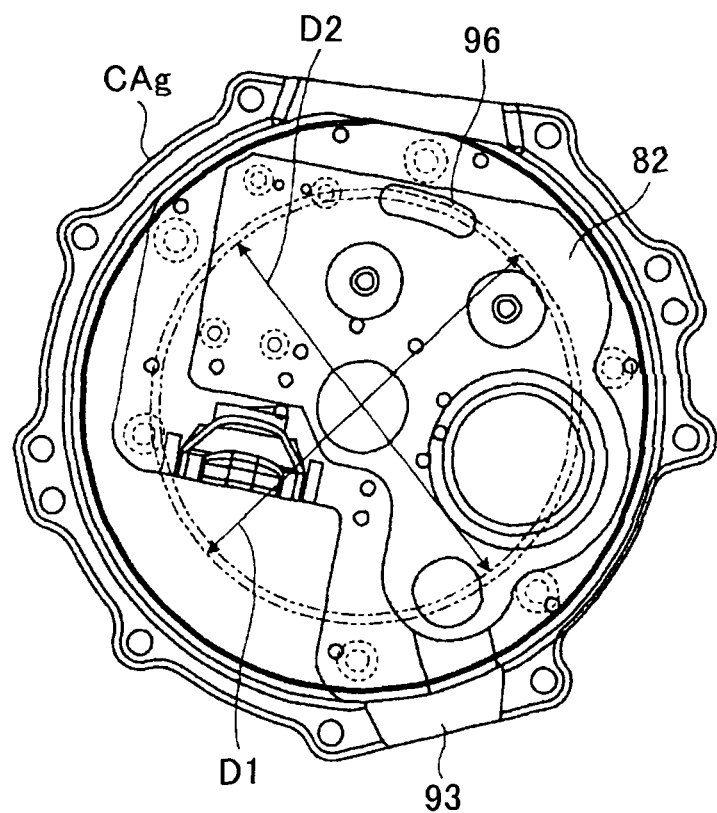
FIG. 7 illustrates a position and a shape of a discharge opening in a first modification.

In the above embodiment, the discharge opening 92, which communicates between the inside of the casing CAt and the shift gear chamber 82, is a circular opening. In this modification, the discharge opening 92 in the continuously variable transmission 1 of the above-described embodiment is replaced by a discharge opening 96 that is an elongated hole in the circumferential direction (FIG. 7). The discharge opening 96 is provided in one of the side walls of the casing CAt in the axial direction.

If the above-described lubricating oil guide section (the inner circumferential surface 22a of the annular member 22) is not provided, this discharge opening 96 is formed either at the position that crosses the oil surface on the radially inner side of the annular lubricating oil or radially outside the oil surface during the operation as seen in the axial direction. On the contrary, if such a guide section is provided, this discharge opening 96 is formed at the position that crosses the oil surface of the annular lubricating oil as seen in the axial direction. Thus, also in this modification, the same effect as that obtained in the embodiment can be obtained for the continuously variable transmission 1.

[Modification 2]

Figure 8:
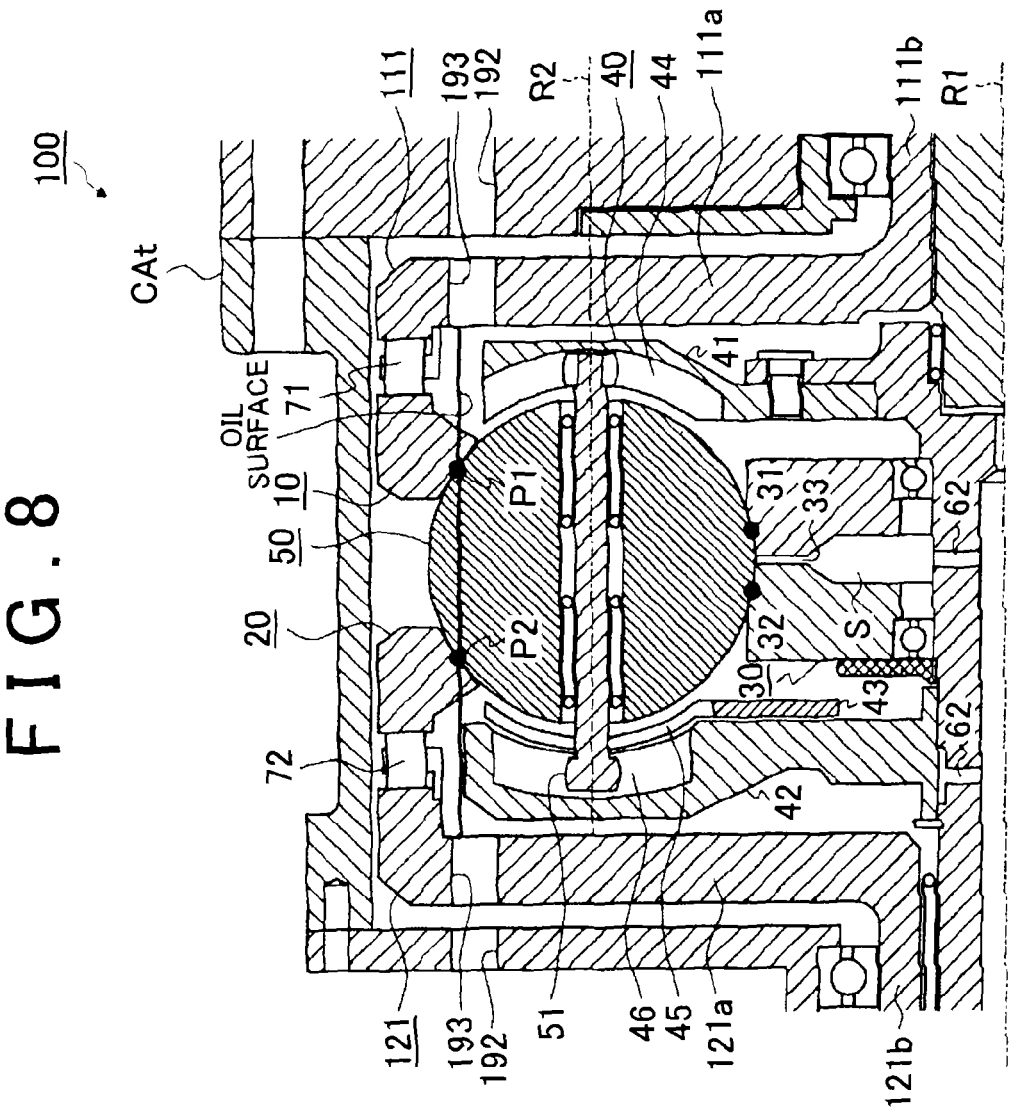
FIG. 8 is a cross-sectional view of one example configuration of a continuously variable transmission of a second modification according to the invention.

In the above-described embodiment, the input shaft 11 and the output shaft 21 extend together on one of the torque input side and the torque output side. As shown in FIG. 8, in a continuously variable transmission 100 of this modification, the input shaft 11 and the output shaft 21 in the continuously variable transmission 1 of the embodiment are respectively replaced by an input shaft 111 and an output shaft 121. It should be noted that the shift gear 81 and the like are not shown in FIG. 8. For example, the shift gear 81 and the like in this case are arranged in the casing CAt.

In this continuously variable transmission 100, the input shaft 111 extends on the torque input side, and the output shaft 121 extends on the torque output side. The input shaft 111 is the same as the input shaft 11 of the embodiment, and includes: a disc section 111a, the first rotary member 10 being coupled to an outer edge portion thereof via the axial force generation section 71; and a cylindrical section 111b that extends in the torque input direction from a radially inner portion of this disc section 111a. Meanwhile, the output shaft 121 includes a disc section 121a and a cylindrical section 121b that are the same as corresponding ones of the input shaft 111. The output shaft 121 and the input shaft 111 are in shapes that face each other in the axial direction with the above-described reference plane being a boundary. The second rotary member 20 is coupled to an outer edge portion of the disc section 121a via the axial force 5 generation section 72. Together with the second rotary member 20, this disc section 121a covers the second and third disc sections 42, 43 of the carrier 40. The cylindrical section 121b extends from a radially inner portion of the disc section 121a in the torque output direction.

In this continuously variable transmission 100, the cylindrical section 111b of the input shaft 111 is projected from the casing CAt in the torque input direction while the casing CAt is kept in the tightly sealed state. In addition, the cylindrical section 121b of the output shaft 121 is projected from the casing CAt in the torque output direction while the casing CAt is kept in the tightly sealed state.

In this continuously variable transmission 100, the lubricating oil in the casing CAt, which includes the lubricating oil discharged from the annular oil passage 33 and the like, is delivered to the radially outer side by the centrifugal force during the operation, and reaches the inner circumferential surface of the casing CAt through the space between the first rotary member 10 and the second rotary member 20. In this way, the annular lubricating oil is generated. In this continuously variable transmission 100, if the lubricating oil flows into a space between the inner circumferential surface of the casing CAt and an outer circumferential surface of the first rotary member 10 and a space between the inner circumferential surface of the casing CAt and an outer circumferential surface of the second rotary member 20, this lubricating oil therebetween becomes a cause of the stirring resistance. Thus, this lubricating oil may inhibit the rotating motion of the first rotary member 10 and the second rotary member 20.

In view of the above, this continuously variable transmission 100 is provided with at least one each of discharge openings 192, 193 for the lubricating oil in the casing, from which some of the annular lubricating oil is discharged to the outside of the casing CAt. The discharge openings 192, 193 are provided on at least one of the torque input side and the torque output side. In the example shown in FIG. 8, the discharge openings 192, 193 are provided on both of the torque input side and the torque output side.

The discharge opening 192 is formed as a through opening in the axial direction in the side wall of the casing CAt. Meanwhile, the discharge opening 193 on the torque input side is formed as a through opening in the axial direction in the disc section 111a. In addition, the discharge opening 193 on the torque output side is formed as a through opening in the axial direction in the disc section 121a. Each of the discharge openings 192, 193 may be a circular hole or an elongated hole, such as the discharge opening 92 in the embodiment or the discharge opening 96 in the modification 1, and may adopt any shape. For example, these discharge openings 192, 193 are formed at positions that cross the oil surface on the radially inner side of the annular lubricating oil or radially outside the oil surface during the operation as seen in the axial direction. Accordingly, some of the annular lubricating oil during the operation is discharged to the outside of the casing CAt via the discharge openings 192, 193. The discharged lubricating oil is delivered to the reserve tank 94.

Here, in this continuously variable transmission 100, the disc sections 111a, 121a rotate relative to the casing CAt in the circumferential direction. Thus, in order to increase lubricating oil discharging performance to the outside of the casing CAt, it is desirable to provide the plural number of each of the discharge openings 192, 193 in the circumferential direction.

As described above, in this continuously variable transmission 100, once the lubricating oil in the casing CAt is guided to the radially outer side and brought into the annular state by the centrifugal force during the operation, some of the annular lubricating oil is discharged from the discharge openings 192, 193 to the outside of the casing CAt. Accordingly, in this continuously variable transmission 100, even when the centrifugal force acts on the annular lubricating oil, the flow rate of the lubricating oil that enters the space between the inner circumferential surface of the casing CAt and the outer circumferential surface of the first rotary member 10 and the space between the inner circumferential surface of the casing CAt and the outer circumferential surface of the second rotary member 20 can be reduced from the conventional flow rate. Thus, in this continuously variable transmission 100, the magnitude of the stirring resistance against the first rotary member 10 and the second rotary member 20 that is caused by the lubricating oil can be reduced from the magnitude of the conventional stirring resistance, and the first rotary member 10 and the second rotary member 20 can rotate smoothly. Therefore, the deterioration in power transmission efficiency can be suppressed.

Furthermore, in this continuously variable transmission 100, it is possible to reduce the stirring resistance against the first rotary member 10 and the like that is caused by the lubricating oil in the space between the inner circumferential surface of the casing CAt and the outer circumferential surface of the first rotary member 10 and the space between the inner circumferential surface of the casing CAt and the outer circumferential surface of the second rotary member 20 without increasing these spaces. Accordingly, in this continuously variable transmission 100, the deterioration in power transmission efficiency can be suppressed without increasing the physical size thereof in the radial direction. Thus, this continuously variable transmission 100 can also contribute to the improved installability thereof to the vehicle and the suppression of increased cost.

By the way, in the above-described embodiment and modification 1, the discharge opening 92 in the shape of the circular opening and the discharge opening 96 in the shape of the elongated opening are exemplified. However, the discharging opening for communicating between the inside of the casing CAt and the shift gear chamber 82 may adopt any shape other than these.

DESCRIPTION OF THE REFERENCE NUMERALS

1, 100/ CONTINUOUSLY VARIABLE TRANSMISSION
10/ FIRST ROTARY MEMBER (FIRST POWER TRANSMISSION ELEMENT)
11/ INPUT SHAFT
11a/ DISC SECTION
11b/ CYLINDRICAL SECTION
20/ SECOND ROTARY MEMBER (SECOND POWER TRANSMISSION ELEMENT)
21/ OUTPUT SHAFT
21a/ FIRST CYLINDRICAL SECTION
21b/ DISC SECTION
21c/ SECOND CYLINDRICAL SECTION
22/ ANNULAR MEMBER
22a/ INNER CIRCUMFERENTIAL SURFACE (GUIDE SURFACE OF GUIDE SECTION)
30/ SUN ROLLER (THIRD POWER TRANSMISSION ELEMENT)
33/ ANNULAR OIL PASSAGE
40/ CARRIER (FOURTH POWER TRANSMISSION ELEMENT, FIXED ELEMENT)
50/ PLANETARY BALL (ROLLING MEMBER)
60/ SHAFT (TRANSMISSION SHAFT)
61/ AXIAL OIL PASSAGE
62/ RADIAL OIL PASSAGE
71, 72/ AXIAL FORCE GENERATION SECTION
81/ SHIFT GEAR
82/ SHIFT GEAR CHAMBER
91/ OIL PUMP
92, 93, 95, 96/ DISCHARGE OPENING
94/ RESERVE TANK
111/ INPUT SHAFT
111a/ DISC SECTION
111b/ CYLINDRICAL SECTION
121/ OUTPUT SHAFT
121a/ DISC SECTION
121b/ CYLINDRICAL SECTION
192, 193/ DISCHARGE OPENING
CAg, CAt/ CASING
g/ SPACE
P1, P2/ CONTACT SECTION
R1/ FIRST ROTATION CENTER AXIS
R2/ SECOND ROTATION CENTER AXIS
S/ SPACE

The invention claimed is:

1. A continuously variable transmission comprising:
a transmission shaft as center of rotation;
power transmission elements including a first power transmission element, a second power transmission element, a third power transmission element, and a fourth power transmission element, each of the power transmission elements having a first rotation center axis that is coaxial with the transmission shaft, each of the power transmission elements being capable of relative rotation to each other in a circumferential direction;
rolling members each having a second rotation center axis, each of the rolling members being arranged radially around the first rotation center axis on an outer circumferential surface of the third power transmission element, each of the rolling members being interposed between the first and the second power transmission elements that are arranged to face each other, and each of the rolling members being held by the fourth power transmission element in a freely tilted manner;

a gear shifter to change a gear ratio between an input and an output by tilting each of the rolling members; and a casing to accommodate the transmission shaft, each of the power transmission elements, and the rolling members, wherein the transmission shaft has a lubricating oil supply opening to supply lubricating oil into the casing from a radially inner side toward a radially outer side, the casing has a discharge opening in at least one of side walls of the casing in an axial direction of the transmission shaft, the discharge opening is arranged radially outside the lubricating oil supply opening, and the discharge opening is to discharge the lubricating oil in the casing to the outside of the casing, and the discharge opening is arranged at any one of the following positions:

a first position that crosses contact sections as seen in the axial direction, the contact sections are between each of the rolling member and each of the first and the second power transmission elements, a second position that crosses auxiliary contact sections as seen in the axial direction, the auxiliary contact sections are between each of the rolling member and each of the first and second power transmission elements, a third position radially outside the contact section, and a fourth position radially outside the auxiliary contact section.

2. The continuously variable transmission according to claim 1, wherein the casing includes a first side wall and a second side wall, a first rotary shaft and a second rotary shaft extend toward the first side wall, the discharge opening is provided in the second side wall, the first rotary shaft is coaxial with the first power transmission element and coupled to the first transmission element, and the second rotary shaft is coaxial with the second power transmission element and coupled to the second power transmission element.

3. The continuously variable transmission according to claim 1, further comprising a guide section to guide the lubricating oil in the casing to the discharge opening, the guide section being provided in the casing.

4. The continuously variable transmission according to claim 1, wherein in a state where the lubricating oil in the casing is brought into an annular state on a radially outer side of the casing by a centrifugal force during operation, the discharge opening is arranged at a position that crosses a radially inner oil surface of an annular lubricating oil.

5. The continuously variable transmission according to claim 3, wherein the lubricating oil in the casing is brought into an annular state on the radially outer side in the casing by a centrifugal force during operation, a radially inner oil surface of an annular lubricating oil exists within a range in a radial direction from the contact section to a lubricating oil guide surface of the guide section, and the discharge opening is formed at a position that crosses the radially inner oil surface as seen in the axial direction.

6. The continuously variable transmission according to claim 1, wherein the discharge opening is to communicate between the inside of the casing and a shift gear chamber, and the shift gear chamber is to accommodate a shift gear of the gear shifter.

7. The continuously variable transmission according to claim 1, wherein in a state where the lubricating oil in the casing is brought into an annular state on a radially outer side of the casing by a centrifugal force during operation, the discharge opening is arranged at a position radially outside of the radially inner oil surface as seen in the axial direction.

* * * * *